United States Patent Office 3,073,952
Patented Jan. 15, 1963

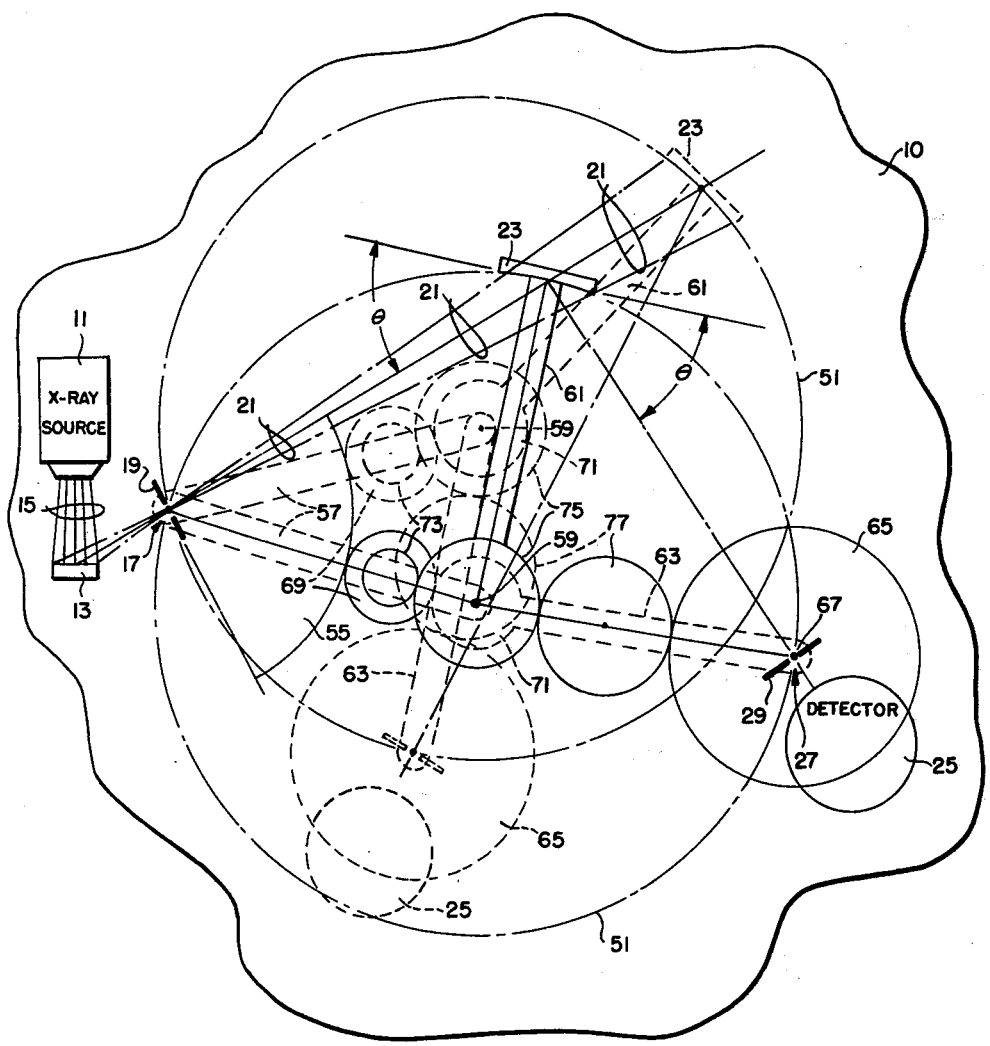

3,073,952
X-RAY DIFFRACTION APPARATUS
Lloyd R. Rose, Milwaukee, Wis., assignor to General Electric Company, a corporation of New York
Original application Sept. 11, 1956, Ser. No. 609,175, now Patent No. 2,898,469, dated Aug. 4, 1959. Divided and this application Jan. 29, 1959, Ser. No. 789,910
7 Claims. (Cl. 250—51.5)

The present invention relates in general to X-ray diffraction analysis, and has more particular reference to improved spectrometric apparatus for the analysis of secondary or so-called fluorescent X-rays emitted by an examination specimen when excited by the impingement of primary X-rays thereon, the same comprising subject matter divided from the copending application for U.S. Letters Patent on the invention of Lloyd R. Rose in X-ray Diffraction Apparatus, Serial No. 609,175, filed September 11, 1956, now U.S. Patent 2,898,459, issued Aug. 4, 1959.

Any crystalline body may be constituted as a source of fluorescent or secondary radiation in response to the application thereto of an exciting beam of primary rays or charged particles. Such induced radiation is characteristic of the atomic composition of the material of the irradiated specimen, since the same comprises rays having wavelengths and intensity ratios which are characteristic of the irradiated material and the nature of the radiation source. The fluorescent radiation thus emitted by a crystal specimen, when suitably excited by application thereto of a primary X-ray beam, may be detected in the form of an X-ray spectrum as a means for identifying or analyzing the material of the specimen.

As stated in United States Letters Patent No. 2,540,821, which issued February 6, 1951, on the invention of David Harker in X-ray spectrometer, it has heretofore been suggested that the apparent intensity of fluorescent specimen emitted X-rays may be increased by use of a bent crystal in obtaining the diffraction spectrum. Such use of a bent crystal, however, involves either the provision of means for altering the curvature of the bent crystal as the detector is moved to scan the resulting spectrum, or the provision of means for altering the spacement between the crystal and the detector during spectrum scanning movement of the detector, in order to keep the diffracted spectrum forming rays focused upon the detector.

An important object of the present invention is to provide fixed focus apparatus for supporting an X-ray detector in position to scan an X-ray spectrum produced by a bent diffraction crystal of fixed configuration, the mechanism serving to maintain the crystal and the detector at all times in an appropriate fixed focus relation with respect to a stationary examination specimen, while permitting the crystal and detector to be adjustably shifted with respect to the stationary specimen in fashion causing the detector to traverse and hence scan the spectrum.

Another object of the invention is to provide spectrometric apparatus of unusual simplicity for the accomplishment of crystal analysis; a further object being to provide apparatus of rugged character, rapidly operable in analyzing the X-ray spectrum of an examination specimen.

Another important object is to provide turnable mechanism for adjusting the angularity of a bent crystal with respect to a stationary examination specimen and simultaneously adjusting a scanning detector with respect to the crystal to maintain the detector at all times in the path of crystal diffracted rays applied thereto from said stationary specimen.

Another important object is to provide an adjustable framework comprising relatively pivoted links operatively associated with a fixed specimen mounting station and serving to shiftably support a diffraction element comprising a bent crystal and an X-ray spectrum detector, in order to maintain the detector in position with respect to the crystal to receive the impingement of diffraction X-rays directed upon the crystal as the result of X-ray excitation of the examination specimen.

Another important object is to provide gear means for determining the relative angular position and spacement between the crystal, the detector and the specimen station.

Briefly stated, the invention provides an adjustable supporting framework having a fixed station for receiving an examination specimen, and support members shiftably and turnably mounted with respect to the specimen support station in order to support a detector adjustably in spaced relation with respect to the specimen station, and also to support a bent diffraction crystal at all times and for all adjusted positions of the detector at such an angle with respect to the detector and station as to apply a diffraction spectrum upon the detector in response to the application of fluorescent rays emitted by a specimen at such station and applied upon the diffraction crystal as the result of X-ray excitation of the specimen at the station.

The foregoing and numerous other important objects, advantages, and inherent functions of the invention will become apparent as the same is more fully understood from the following description, which, taken in connection with the accompanying drawings, discloses preferred embodiments of the invention.

Referring to the drawings,

The single FIGURE is a diagrammatic view of adjustable mechanism providing a bent crystal focusing system embodying the invention.

To illustrate the invention the drawings show X-ray spectographic apparatus embodying a main frame carrying an X-ray source 11, such as a conventional X-ray generating tube, and an examination specimen 13 of crystalline material to be analyzed, said specimen being supported at a fixed examination station on the main frame in the path of a beam of primary X-rays 15 emitted by the source 11. Application of the X-ray beam 15 upon the specimen 13 will excite the same for the emission of secondary or fluorescent X-rays therefrom, which secondary rays are characteristic of the atomic composition of the specimen. Some of such X-rays may be emitted in a direction to pass through a slit-like opening 17 formed in a pane or panel 19 of material that it relatively impervious to X-rays, said opening 17 thus comprising a stationary source slit defining a beam 21 emitted by the specimen 13 and comprising fluorescent X-rays characteristic of the material of the specimen.

The apparatus of the present invention also embodies a diffraction crystal 23 turnably supported in the path of the beam 21, said crystal serving to diffract the ray beam in known fashion and focus the diffracted beam upon a ray sensitive detector 25, the diffracted beam being delivered through a slit-like opening 27 formed in a plate 29 of material that is relatively opaque to X-rays.

In order to analyze the X-ray spectrum of the diffracted beam, the present invention provides adjustable mechanism 31 operable to progressively alter the inclination at which the ray beam 21 impinges upon the diffraction crystal 23 and the corresponding angularity of the detector 25 in position with respect to the crystal to receive the focused impingement of the diffracted beam on said detector. The mechanism 31 is supported on the main frame and is arranged so that the diffraction crystal 23 is at all times in alined position to receive the impingement of the ray beam 21, the examination sample 13 and the X-ray source 11 at all times remaining fixed on the main frame. The mechanism 31 is also arranged so that the configuration of the diffraction crystal 23 remains fixed.

The mechanism 31 may comprise a fixed gear segment 55 subtending an angle somewhat in excess of 90° and secured on the main support frame in position such that the gear segment is centered on an axis in alinement with the beam defining slit 17 in the plate 19. The mechanism 31 may also comprise a support arm 57 pivotally supported at one end for turning movement about an axis in alinement with the beam defining slit 17, the opposite end of said arm 57 extending to and providing a pivot axis 59 which at all times lies at the center of a focusing circle 51. It will be noted that, in each position of adjustment of the mechanism 31, the diffracting surface of the crystal 23 and the beam guiding slits 17 and 27 lie on the focusing circle 51 which is of uniform size for all adjusted positions of the mechanism 31. The diffraction crystal 23 is supported upon one end of a carrying arm 61, the opposite end of which is pivotally mounted upon the support arm 57 at the axis 59.

A detector supporting arm 63 is also supported at one end on the arm 57 for pivotal movement about the axis 59, the other end of said support arm 63 carrying a gear wheel 65 turnably mounted thereon for rotation about an axis 67 which is at all times disposed upon the focusing circle 51. The detector 25 is supportingly secured on the gear wheel 65, which also carries the plate 29 in which the slit 27 is formed in alinement with the pivot axis 67. The carrying arms 61 and 63 and the support arm 57 are drivingly interconnected by means of bisecting gears including a gear 69 having teeth meshing with the teeth of the segment 55, the teeth of said gear 69 also being drivingly interconnected with the teeth of a gear 71, which is fixedly connected with the detector carrying arm 63 and mounted for turning movement on the support arm 57 about the axis 59. Fixed to and driven with the gear 69 is a spur gear 73 having teeth drivingly meshed with the teeth of a gear 75, which is fixedly connected with the crystal carrying arm 61 and supported on the arm 57 for turning movement about the axis 59. The driving ratio of the gears 73 and 75 may be double that of the gears 69 and 71 so as to maintain the crystal 23 at all times in position on the focusing circle midway between the slits 17 and 27, the gears 69, 71, 73 and 75 thus functioning as bisecting gears.

The arm 63 may also carry a gear 77 turnably mounted thereon in position to drivingly engage the detector carrying gear 65 and the gear 75 which functions to turn the crystal carrying arm 61 about the pivot axis 59. The gears 65, 75 and 77 are so proportioned as to adjust the detector carrying gear 65 in position at all times to aim the detector and the slit at the diffraction crystal. If desired, the main frame may be provided with a cam slot defining the path of the axis of the detector carrying gear 65.

It will be seen from the foregoing that the diffraction angle θ may be determined as one-half of the angle made between the carrying arm 61 and either of the arms 57 and 63 at the axis 59, the same being one-quarter of the angle defined between the arms 57 and 63. The diffraction angle, accordingly, may be measured on a suitable graduated protractor applied to the arms. It will be seen also that the diffraction angle is a function of the angularity of the carrying arm 57 about its mounting axis on the main frame. The diffraction angle, therefore, may be determined by means of a graduated protractor disposed in position to determine the relative angularity of the arm 57 with respect to the main frame. It will be apparent, also, that the diffraction angle is a function of the relatively turned positions of any of the gears and may therefore be revealed upon any suitable or preferred indicator means driven by or in unison with the movement of any of the gears 65, 69, 71, 73, 75 or 77. Any suitable or preferred manually operable or motor driven means any, of course, be provided for turning the gears for the purpose of adjusting the mechanism.

The foregoing fixed focus spectrometric mechanism is particularly useful since adjustment thereof in diffraction analysis requires no motion of the X-ray tube, the sample and the source slit. As a consequence, the mechanism may be employed in analyzing horizontally supported samples, including liquid bodies. The mechanism furthermore is of simple, uncomplicated character in that the diffraction crystal has fixed configuration, thereby avoiding the necessity of providing mechanism for adjusting the shape of the crystal during movement of the mechanism during diffraction analysis.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. Diffraction apparatus comprising: a specimen support; an apertured device fixedly positioned relative to said support; a diffraction crystal; a ray sensitive detector; said apertured device, crystal and detector being positioned relative to each other to define a circle having a predetermined radius; and means comprising a plurality of connected gears for moving said crystal and said detector relative to each other and moving each both rotationally and translationally relative to said apertured device to change the position of the center of said circle while maintaining its radius constant.

2. Diffraction apparatus as recited in claim 1 wherein said means includes means constraining the translational motion of the axis of said diffraction crystal along a single imaginary line passing through the aperture of said apertured device.

3. Diffraction apparatus as recited in claim 2 including means to rotate said crystal about its axis by an amount uniquely determined by the distance of said crystal from said aperture whereby a ray passing through said aperture illuminates a constant area of said crystal irrespective of the distance between said crystal and said aperture.

4. X-ray diffraction apparatus comprising: a source of X-rays; a specimen support disposed in the path of said X-rays and in fixed angular relation thereto, the relation of said source and support thereby defining a second X-ray path from said specimen fixedly oriented in space; an X-ray diffraction crystal mounted in said second path; an X-ray sensitive detector positioned to view X-rays from said diffraction crystal; and motive means connected to said crystal and said detector for simultaneously moving said crystal linearly along said second X-ray path exclusively and said detector along a path to maintain said view of said crystal, and for rotating said crystal as a function of said linear position along said second path to insure that a constant area of said crystal is illuminated by X-rays of said second path irrespective of said crystal's position along said second path even when said area is less than the total area of said crystal.

5. Diffraction apparatus comprising a support frame or base providing means for supporting a specimen at an examination station in position for irradiation with penetrating rays, a source collimator formed with a slit for defining a beam of secondary radiation emitted from a specimen irradiated at said station, a diffraction crystal, a first movable arm carrying said crystal at an end thereof, a second movable arm supported at one end on said frame or base for pivotal movement about an axis in alinement with the slit of said source collimator, a detector and an associated collimator forming a slit adjacent the detector, a third movable arm carrying said detector and associated collimator for turning movement on an end of said third arm about an axis in alinement with the slit of said detector associated collimator, the other end of said third arm and the crystal remote end of said first arm being supported for pivotal movement about a common axis at the collimator remote end of said second arm, and gear means for turning the second arm on said frame, for turning said first arm carrying said crystal and said third arm carrying said detector with respect to the second movable arm, and for turning the detector and associated collimator with respect to said third movable arm.

6. Diffraction apparatus as set forth in claim 5, wherein the gear means turns the first arm on the second movable arm at twice the angular rate at which the third arm carrying said detector is turned.

7. Diffraction apparatus as set forth in claim 5, wherein the gear means turns the detector on the third arm at an angular rate to maintain the detector and associated collimator slit at all times aimed precisely at the crystal.

References Cited in the file of this patent

UNITED STATES PATENTS

| | | |
|---|---|---|
| 2,648,011 | Good | Aug. 4, 1953 |
| 2,783,385 | Wytzes | Feb. 26, 1957 |
| 2,805,341 | Lang | Sept. 3, 1957 |
| 2,898,470 | Khol | Aug. 4, 1959 |
| 2,901,629 | Friedman | Aug. 25, 1959 |
| 2,924,715 | Hendee et al. | Feb. 9, 1960 |
| 3,005,098 | Buschmann | Oct. 17, 1961 |